(No Model.)

3 Sheets—Sheet 1.

H. M. KEITH.
SEED DRILL AND FERTILIZER.

No. 258,928. Patented June 6, 1882.

WITNESSES:

INVENTOR.
Horace M. Keith
by Johnson & Johnson
ATTORNEYS.

(No Model.) 3 Sheets—Sheet 2.
H. M. KEITH.
SEED DRILL AND FERTILIZER.
No. 258,928. Patented June 6, 1882.
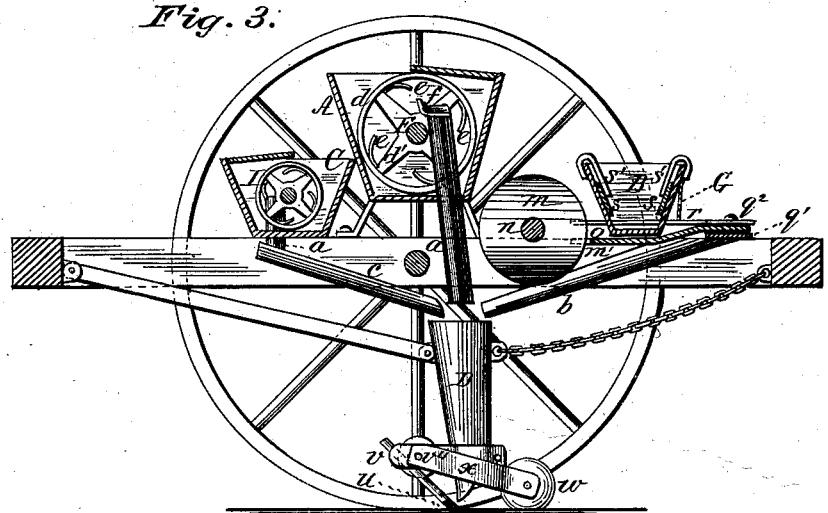
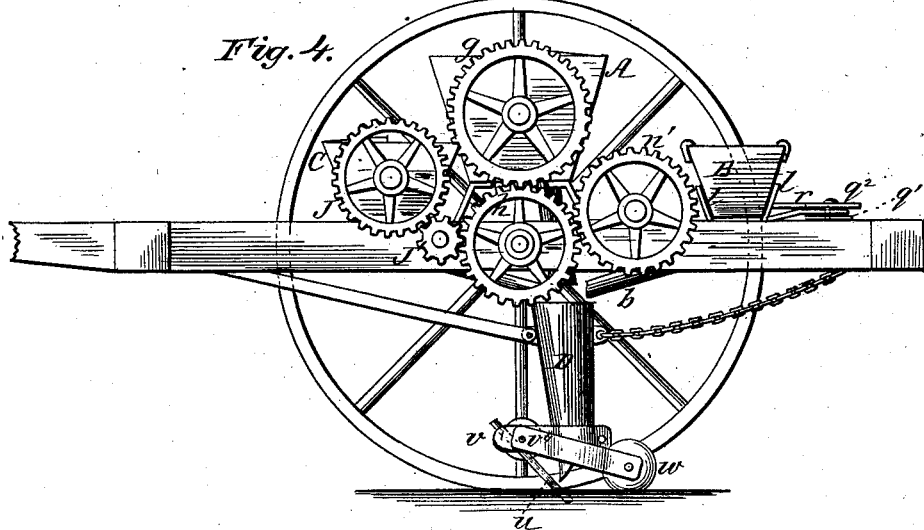
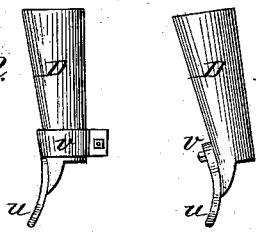
WITNESSES:
Fred. G. Dieterich
P. C. Dieterich
INVENTOR.
Horace M. Keith
by Johnson and Johnson
ATTORNEYS.

(No Model.) 3 Sheets—Sheet 3.
H. M. KEITH.
SEED DRILL AND FERTILIZER.
No. 258,928. Patented June 6, 1882.
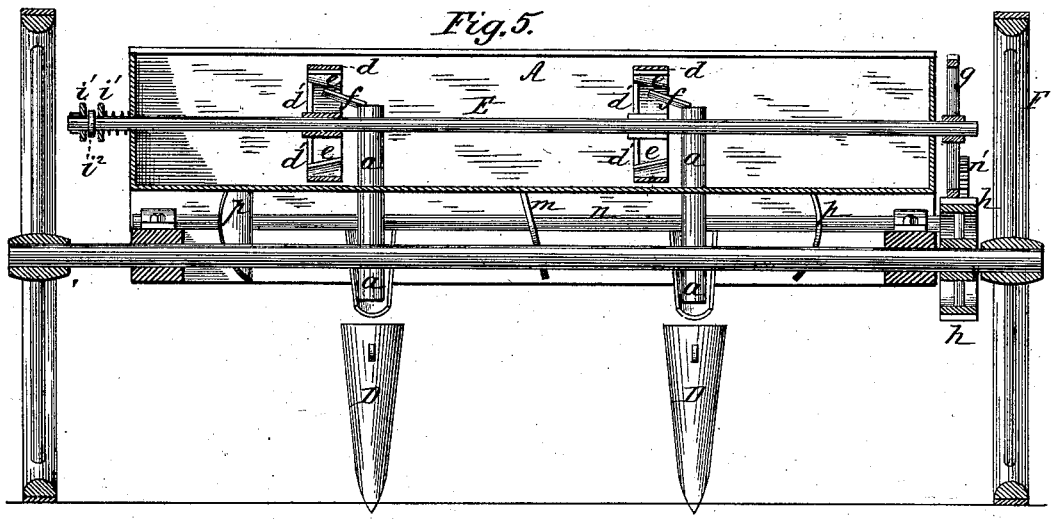
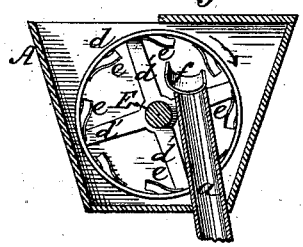
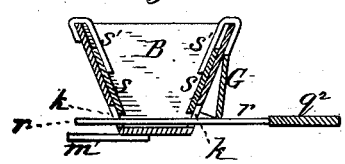
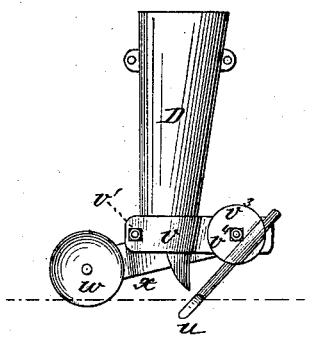
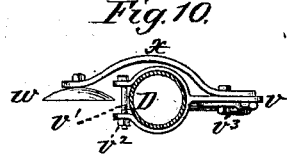
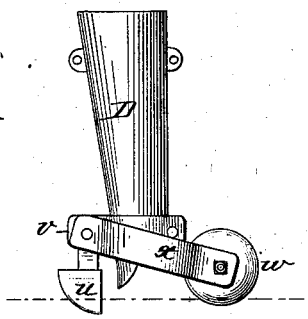
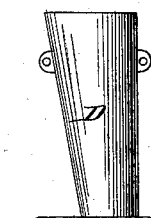
Witnesses:
Edmond Broskag
Howell F Barlett
Inventor:
Horace M. Keith
by Johnson and Johnson
Attys
N. PETERS. Photo-Lithographer, Washington, D. C.

UNITED STATES PATENT OFFICE.

HORACE M. KEITH, OF COMMERCE, ASSIGNOR OF ONE-HALF TO JOEL P. HARGER, OF PONTIAC, MICHIGAN.

SEED-DRILL AND FERTILIZER.

SPECIFICATION forming part of Letters Patent No. 258,928, dated June 6, 1882.

Application filed February 18, 1882. (No model.)

*To all whom it may concern:*

Be it known that I, HORACE MASON KEITH, a citizen of the United States, residing at Commerce, county of Oakland, and State of Michigan, have invented new and useful Improvements in a Seed-Drill and Fertilizer, of which the following is a specification.

I have combined in a grain-drill means of novel construction for effecting the feed of the seed, means of novel construction for effecting the feed of the fertilizer, and means of novel construction for adapting the drill for drilling in clover-seed on winter-growing wheat without tearing it up or covering it—a thing, so far as I know, not hitherto done in the growing of clover on winter-growing grain. The specific improvements embraced in these several matters will form the subject of separate and distinct claims, and the objects of my several improvements will be declared in connection with the particular description which I shall now proceed to give of the construction and operation of my improved seed-planter.

Figure 1:
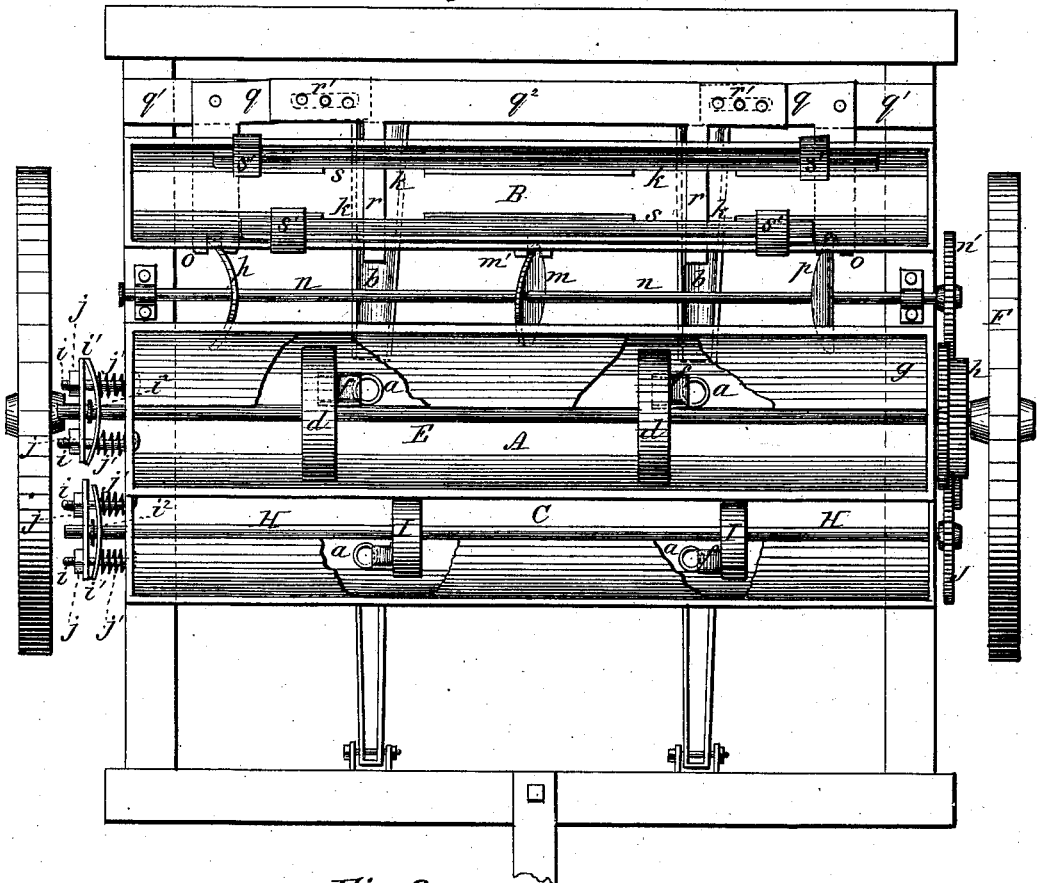
Figure 2:
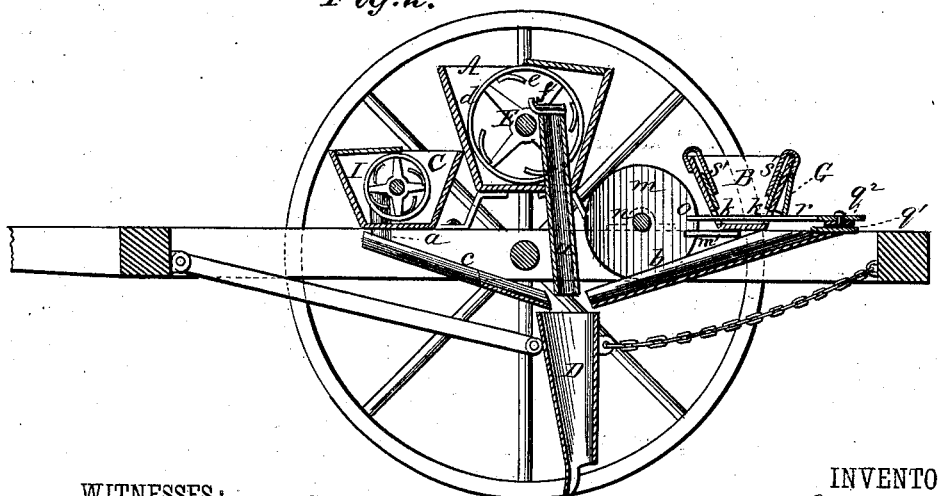

Referring to the accompanying drawings, Figure 1 represents a top view of a seed-drill embracing my invention; Fig. 2, a vertical cross-section of the same; Fig. 3, a vertical cross-section, showing the drill-tube attachment for drilling clover-seed in winter-growing wheat. Fig. 4 shows the gearing side of the machine; Fig. 5, a vertical longitudinal section; Fig. 6, an enlarged cross-section of the grain-feeding device; Fig. 7, an enlarged sectional view of the fertilizer-feed device; and Figs. 8, 9, 10, 11, 12, and 13 are enlarged details of the seed-feeding device.

A strong frame of side and cross timbers supports the several operating parts of the seeder, and is carried by wheels, which are preferably loose upon the axle. The seed-hopper A is mounted upon the frame in position over the axle, a fertilizing-hopper, B, being arranged in the rear, and a clover-seed hopper, C, in front, of said hopper.

The drill-tubes D are carried in the usual manner by drag-bars and adjusting-chains, and suitable tubes or chutes, $a\ b\ c$, from their respective hoppers, A B C, deliver the seed and the plaster into the drill-tubes, as required. The feed devices of the hoppers A and C are alike, but suited to different sizes of seed, and a description of such devices will apply alike to both hoppers.

A shaft, E, is mounted in the hopper, projects beyond each end thereof, and is adapted for longitudinal adjustment therein. A wheel of buckets is fixed upon this shaft, one wheel for each drill-tube—say from eight to fifteen—and the hopper should be of a size to suit wheels of about eight inches in diameter for feeding wheat. The wheel consists of a band, $d$, about three-quarters of an inch wide, mounted upon spokes $d'$ along its edge, so that the band has an unobstructed interior space for the arrangement and operation of buckets $e$, secured on the inner side of the band across its width in closely set relation and slightly inclined to the axis of the wheel, so as to dip up and carry the seed to the top and empty it in passing such point, so as to feed continuously. The tube or chute $a$, which conducts the seed into the drill-tube, passes through the bottom of the hopper and extends above it to one side of the shaft, and at that side of the wheel at which the interior buckets are on their descent after having emptied their contents. This tube or chute $a$ is provided with a top inclined tray, $f$, which extends within the wheel-band $d$ always above the seed in the hopper, and in such fixed relation to the revolving interior buckets as to receive the seed as it is emptied therefrom at the top of the wheel and deliver it into the said hopper-tube, and thence into the drill-tube. The inclination of the interior buckets is such as to cause the seed to drop out of them about as they are passing over the tray. The shaft of the said bucket-wheels is driven by a gear, $g$, thereon at the end of the hopper, meshing with a long gear, $h$, on the drive-wheel F.

The longitudinal adjustment of the shaft E is to bring the bands of the feed-wheels more or less over the trays $f$, and thereby cause the interior buckets, which are arranged across the bands, to empty more or less seed into the trays. The means for effecting this adjustment consist of screw-stems $i\ i$, secured to and projecting from the other end of the hopper and connected to the said shaft by a plate or plates, $i'\ i'$, through holes in which the said shaft and screw-stems pass, the plates being connected to the shaft by a collar, $i^2$, fixed thereon and embraced by said plates. Screw-nuts $j$ upon the stems $i$, when turned to the right, serve to move the shaft, with its wheels of buckets, toward the fixed trays $f$ in the hopper, and thus carry the bands and their buckets over a greater portion of each tray and deliver into them a greater portion of the seed which they dip up. To diminish the feed the screw-nuts $j$ are turned to the left and the shaft is moved out, carrying the feed-wheels away from the fixed trays by the action of springs $j'$, placed upon the said stems $i$, between the hopper and the said plates $i'$, and constantly exert their force to move the shaft out and to press the plates against the adjusting-nuts. The gear $h$ of the drive-wheel is of a length to allow the required endwise movement of the feed-wheel shaft and maintain its gear connection. When the feed-wheels are adjusted so that the trays are fully within the wheel-bands and under the full length of the interior buckets, the trays will catch all, or nearly all, the seed emptied from the buckets, and thus give the full planting capacity of the drill, which may be desired for certain kinds of seed and soils. When, however, it is desired to lessen the quantity of the feed, the adjusting-nuts are unscrewed and the springs will force the feed-wheels away from the trays, and the buckets will thereby travel with only a part of their length directly over the trays, and can only therefore empty a portion of their contents into them.

The seed not caught by the trays falls back into the hopper. By giving the required adjustment to the screw-nuts the feed-wheels may be sufficiently withdrawn from the trays to carry the path of the buckets so far from the trays that the seed will fall free of them into the hopper, and thus stop the feed to the drills in going to and from the field. To allow of the required range of adjustment of the feed-wheels, the screw-stems and the feed-wheel shaft connected therewith should extend the required distance—say three or four inches beyond the end of the hopper.

The feed-wheel band should be carried by open spokes $d'$, to give free access for the seed to the interior buckets at both sides of the wheel, so that the buckets will fill uniformly as the bands revolve through the seed in the hopper. This construction gives a free, certain, and regulated feed of the seed, whether small or large, and avoids the liability to choke or clog incident to small passages in the bottom of the hopper and to wheels with circumferential and surface cells. Such construction also gives the advantage of increasing the capacity of the machine for drilling different kinds of seed—such as wheat, oats, corn, pease, and beans—in the desired quantities and with certainty, by merely adjusting the feed-wheel shaft as stated.

The principle of the feed is that the quantity of seed dipped up by the buckets is always the same, and that in being elevated above the seed in the hopper and falling from the revolving interior buckets the desired quantity is intercepted and directed into the drill-tubes, while the surplus falls back into the hopper.

The buckets and conducting-tubes may be made to suit the drilling of large or small seed; but of whatever size and form, the feed and the manner of regulating it will be the same, as the seed in the hopper will always be on a level below the trays and the interior buckets will always empty their contents in the space within the band above the trays. In the drawings I have shown two of these feed-wheels; but they must be arranged according to the distance of the drills apart.

The hopper B for the fertilizer is arranged in the rear of the seed-hopper, and is, say, four inches wide at the bottom, eight inches wide at the top, and about ten inches high. Each side of this hopper has slots $k$ on a plane with the bottom about six inches long and about a half-inch wide. They are opposite each other, and are separated from each other only about half an inch, and equal in length to the movements of the hopper. This hopper is adapted for endwise movement, and for this purpose is fitted in suitable guides, $l$, Fig. 4, rising from the sides of the frame. This movement of the hopper is effected by means of a serpentine cam, $m$, secured upon a shaft, $n$, mounted upon the frame between the hoppers A and B, and revolved by a gear, $n'$, meshing with the long gear $h$ of the drive-wheel, the said cam being so formed and placed upon the shaft that its circumference or edge will revolve in the slot of an arm, $m'$, fixed to and projecting from the bottom of the hopper, and cause the same to slide once back and forth in its guides during one revolution of the cam. The extent of such movement is about six inches, and is for a purpose to be presently stated.

Upon the frame-bar $q'$, at the back of the fertilizer-hopper, and near each end thereof, is pivoted a bell-crank lever, one arm, $o$, of each lever extending beneath the hopper and slotted to receive the circumference or edge of a serpentine cam, $p$, fixed upon and near each end of the shaft $n$, and of a form adapted to give a faster motion to the levers than the middle cam, $m$, gives to the hopper. The other arms, $q$, of these bell-crank levers extend toward each other parallel, or nearly so, to the hopper, and are pivoted to a bar, $q^2$, the pivots working in slots in said arms. This bar has narrow thin arms $r$ extending at right angles therefrom into and through the slots $k$ of the hopper, there being one such arm corresponding to each division of the hopper-slots and to each drill-tube, and having a length sufficient to pass through the hopper and to reach three or four inches beyond the inner side thereof. The extent of the movement of these arms of these bell-crank levers is about three or four inches, each describing the arc of a circle, giving to the outer arms, $q$, a vibratory movement toward and from the hopper, and consequently vibrating the pivoted armed bar $q^2$ in the same direction and to the same extent by reason of their slotted connection. This movement of the pivoted bar causes its series of arms $r$ to have a reciprocating movement across the hopper-bottom and through its slots, and, in connection with the simultaneous movement of the hopper, cause the plaster to be fed therefrom through the slots at each side of the hopper.

The pivot-connections of the armed bar $q^2$ may be adjusted by a series of holes, $r'$, in the ends of said bar, and thus increase or diminish the movement of the feed-arms $r$ in the slots in the hopper. By placing the pivots in the end holes of the bar $q^2$ the least movement is given to the feed-arms, and they are caused to carry out less plaster than when said pivot-connections are made farther away from the pivots of the levers, which would give greater strokes to the feed-arms, and thus regulate the feed by giving greater or less movement to the feed-arms through the hopper-slots.

The width of the feed-slots $k$ is regulated by means of thin strips $s$, held by loops $s'$ or set-screws upon the inner sides of the hopper, so as to be raised and lowered over said slots to regulate the feed therefrom. When these strips are set down upon the feed-arms it nearly shuts off the feed from the hopper, and when raised the feed is increased.

The movement of the hopper across the vibrating feed-arms $r$ feeds the plaster from the hopper over each arm the length of the slot $k$ in which it moves, the arms thereby always moving under and in contact with the plaster, thus feeding the plaster out just as it settles down. Were the hopper fixed, this result would not be so effective and satisfactory; but the movement of the hopper over the feed-arms and the movement of the latter over the bottom of the hopper co-operate to feed the plaster out both sides of the hopper, the feed being made continuous on both sides by reason of the simultaneous movements of these parts.

A scraper, G, is fixed upon the rear side of the hopper, with its lower edge in contact with the feed-arms $r$ for scraping off the plaster as the arms are moved out under it.

Chutes or tubes $b$ are attached to the rear of the frame, and extend beneath the hopper in position under each feed-arm to receive and conduct the plaster into the drill-tubes from both sides of the hopper.

My invention embraces means for drilling clover-seed on growing winter wheat, and for this purpose I may use the hopper and feed-wheels already described. I prefer, however, to use a separate hopper, C, and shaft H, of feed-wheels I therein, as shown. The feed-wheels for this purpose are about four inches in diameter, and the shaft upon which they are secured is driven by a gear, J, meshing with the gear $g$, or with a pinion, J', which is driven by the long gear of the drive-wheel, or in any other suitable way.

Tubes of rubber or other material, $c$, connect with and conduct the clover-seed from the hopper-tubes $a$ into special conductors or into the drill-tubes. These conducting-tubes, however, could not be used for drilling in the clover-seed, as they would tear up and cover the growing wheat or rye, and for this reason I have never known clover to be sown in drills on growing winter wheat or rye that was planted in the fall.

Clover seed, when sown on the ground broadcast, will quite likely not grow if the soil is dry and light, and other grass-seed will not grow well on such soil. In such soil clover will grow if drilled in, and makes a good fertilizer for such soil. For drilling in clover in the spring upon growing wheat or rye that was planted in the fall I have devised a supplemental drill attachment to the ordinary drill-tubes, thus specially adapting the drill for special work—viz., drilling clover-seed on growing wheat without tearing it up or covering it, as would result from the use of the usual drill-tubes, and greatly increasing the capacity and general usefulness of the seeder.

The drilling of plaster with clover-seed is also an important advantage never before effected upon growing wheat.

The supplemental drill which I have found best adapted for drilling clover-seed upon growing grain is a thin, sharp point, $u$, carried by an arm, $v$, attached to and extending in front of the conducting-tube. This sharp attachment of whatever form projects below the point of the conducting-tube, so as to make a narrow cut in the ground through the growing grain deep enough to let the clover-seed descend into moist soil, and it may be so drilled with a fertilizer to insure its growth. The drilling of clover-seed in this way also saves a large percentage over the old way. It also saves the labor and expense of having to harrow the ground and to sow plaster over it after the clover-seed has been sown.

The arm $v$ may be made with a yoke end, so as to embrace the lower end of the drill-tube, and is clamped to it by a clip, $v'$, passing through holes in the yoke ends of the arm and securely bound by screw-nuts $v^2$ to the back of the drill-tube. The arm $v$ extends horizontally in front of the drill-tube about five inches. The thin sharp drill forming point $u$ is secured to this part of the arm, and is preferably a thin tooth placed in a position inclining upward and frontward, so as to be drawn through the soil without tearing up or covering the growing grain. It is secured in a groove in the side of the arm by a clamp, $v^3$, having a groove corresponding with the shank of the thin tooth, but not quite as deep as the said shank is thick, so that the clamp, by means of a bolt, $v^4$, passing through the clamp and the arm, will firmly bind and hold the tooth in its set position.

The arm may have two or more holes to receive the clamping-bolt for the point, and on one side of each of said holes a groove may be formed in the arm at different inclinations, so that the cutting-point is thereby adapted for adjustment nearer to or farther from the tube and to change its angle of inclination, as may be required. This capacity for adjusting the cutting-tooth allows it to be set to cut into the ground at variable depths to suit soft sandy soils or hard clay. For soft sandy lands the tooth should have an inclination of about forty-five degrees, and for clay it should be set at a less inclination. In either position the seed will enter the cut just back of its forming-tooth, and the cut will be made as an open mark, raising as little soil as possible on either side, so that little or no injury is done to the growing grain. The cutting-points also serve to pass the drill or conducting tubes safely over fast stones and other obstructions. The clover-seed thus planted is covered by a small dish-shaped wheel, $w$, carried in the rear of the drill-tube in the line of the cutting-tooth by an arm, $x$, bent around the side of the drill-tube and suitably secured to the front arm, $v$, by the same screw-bolt and nut by which the clamp for the cutting-tooth is secured to its arm, but on the opposite side thereof. This wheel runs in the cut or drill-mark, covering the seed and packing the earth more or less on the seed to facilitate its growth.

While I prefer the thin drilling-point clamped in an inclined position, as described, yet the same object may be obtained by a thin dish-shaped wheel, cutting the drill-mark as it rolls along in the ground; or a curved or straight cutting-blade may be used, or other similar thin cutting device suitably mounted as an attachment to a conducting-tube, or to a drill seed-conductor of any form, for cutting down into the ground and making a drill-mark without turning the soil or pulling up the growing grain.

Whatever form may be used for the clover-drill device, it should have a thin cutting-edge, so as to enter the soil freely and cut its way through it under the weight of the drill-tube or seed-conductor.

The drill is used for planting the crop without the clover-seed drill attachments, and when said attachments are used with the drill-tubes the latter must be set sufficiently high to clear the ground and allow the cutting-point only of the supplemental drill to enter and run along into the ground, as described, so as to make the least possible destruction of the growing grain at the same time clover-seed and plaster are being drilled in.

The hoppers are provided with covers, and the frame has the usual tongue by which the seeder is drawn.

The employment of revolving disks provided with elevator cups or dippers arranged upon the side or sides of said disk or carried upon the ends of arms projecting at right angles therefrom for dipping the seed from the bottom of the hopper—and as they become inverted in the course of their revolution they effect thereby the dropping of the seed into a conducting-tube projecting above the bottom of the hopper and opening into the drilling-tube—is old in seed-drills, the feed from such revolving elevators being regulated by the size and number of the cups, or by double-ended cups having different-sized cells or cavities, and adapted for use with a disk capable of being revolved in different directions to feed from either series of cups. A feeding-wheel of elevator-cups is not therefore broadly claimed.

I claim—

1. The combination, substantially hereinbefore set forth, in a seed-drill, of a hopper having interior vertical seed-conducting tubes or chutes, provided with top inclined trays, with feed-wheels having internal buckets adapted to operate in relation to said trays, for the purpose specified.

2. The combination, substantially hereinbefore set forth, in a seed-drill, of a hopper having interior vertical seed-conducting tubes or chutes, provided with top inclined trays, with feed-wheels having internal buckets and means for laterally adjusting said feed-wheels in relation to the trays, for the purpose specified.

3. In combination, the hopper, the fixed vertical tubes or chutes therein, the open feed-wheels having internal buckets, the shaft upon which they are fixed, and means for effecting the endwise adjustment of said shaft, and the feed-wheels thereon, consisting of the screw-stems $i$, the coupling-plates $i'$, the screw-nuts $j$, and the spring $j'$, arranged at the end of the hopper, whereby to set the feed-wheels toward and from the fixed hopper-tubes, for the purpose specified.

4. The feed-wheel band $d$, mounted at one edge upon spokes $d'$, and having buckets $e$, arranged upon the interior wall of said band, in combination with a fixed tube or chute having a tray extending within and beneath the said band toward its spoked side and below the path of the buckets, and the hopper through the bottom of which the said chute passes, substantially as described, for the purpose specified.

5. The combination, in a seed-drill, of the hopper for the fertilizer having longitudinal side slots, $k$, on a plane with its bottom, with feed-arms $r$, passing into and through said slots and having a reciprocating movement across and upon the bottom of the hopper, and means for producing such movement, whereby to effect the feed of the fertilizer from both sides of the hopper, substantially as described.

6. The hopper for the fertilizer adapted to have an endwise movement, and provided with longitudinal side slots, $k$, on a plane with its bottom, in combination with feed-arms $r$, adapted to operate within and through said slots and across the hopper-bottom, and means for operating both the hopper and the said feed-arms, substantially as described, for the purpose specified.

7. In combination, the hopper for the fertilizer adapted to have an endwise movement, and having longitudinal side slots, $k$, on a plane with its bottom, feed-arms r, adapted to operate within said slots upon and across the hopper-bottom, bell-crank levers pivoted to the frame, and serpentine cams p, for operating said levers, the said feed-arms being carried by a bar pivoted to said levers and operated, in the manner and for the purpose specified, by suitable drill drive-gear connections.

8. The hopper for the fertilizer adapted to have an endwise movement, having longitudinal side slots, k, and side strips, s, adapted for vertical adjustment in relation to said slots, the scraper G upon the rear side of the hopper, and the feed-arms r, adapted to operate within said slots upon and across the hopper-bottom and beneath the said regulating-strips s, and the scraper, all constructed and combined with the seed-drill tubes and with the chutes b, substantially as described, for the purpose specified.

9. The combination, with the drill-tubes of a seed-planter, of the hopper for the fertilizer, the guides l for said hopper, the serpentine cam m for operating said hopper, the feed-arms r, operating through slots in the sides of the hopper, the bell-crank levers pivoted to the carrying-bar of said feed-arms, the serpentine cams p, and the shaft n, operated by the drive-gear of the drill, the said serpentine cams being arranged in relation to each other to operate simultaneously the hopper and the feed-arms to deliver the fertilizer from both sides of the hopper.

10. The combination, substantially hereinbefore set forth, in a seed-drill, of the drill-tubes thereof with a supplemental drill-point or cutting-edge adapted for attachment to said drill-tube, and operating in front thereof, for the purpose specified.

11. The supplemental drill device, consisting of an arm, v, having a yoke and a dip, v', whereby it is secured to a drill-tube, and a narrow point or cutting-edge, u, carried by said arm in front of and below said drill-tube, substantially as described, for the purpose specified.

12. The combination, substantially hereinbefore set forth, of a seed-conducting tube with a thin narrow cutting blade or point, u, and a covering device, substantially as described, and adapted to travel in the slit made by said narrow cutting-blade, for the purpose specified.

13. The combination, substantially hereinbefore set forth, of a seed-conducting tube and an attachable thin or narrow cutting blade or point, u, with an attachable covering-blade, w, constructed substantially as described, and adapted to travel in the slit or narrow opening made by said cutting-blade, for the purpose specified.

14. The combination of the seed-conductor with the arm v, extending in front thereof, the clip v', the narrow drill-forming point u, a clamp, $v^3$, therefor, and a covering dish-shaped wheel, w, substantially as described, for the purpose specified.

15. The combination, in a seed-drill, of a seed-conductor, a thin or narrow cutting blade or point, u, and a covering-blade, w, as described, with the seed-hopper C, a feed device for feeding the seed continuously, and a chute, c, substantially as and for the purpose specified.

16. In combination in a seed-drill and fertilizer, the hopper C, its feed device, the hopper B, its feed device, means, substantially as described, for connecting and operating the feeding devices of said hoppers, means for rendering the feed devices of the hopper A non-operative, a drill-forming point or cutting-blade adapted for attachment to the drill-tube, and a covering device adapted to travel in the cut made by the drill-forming point, substantially as described.

In testimony whereof I have hereunto set my hand in the presence of two subscribing witnesses.

HORACE M. KEITH.

Witnesses:
FRANKLIN A. CRAWFORD,
MARK WALTER.